United States Patent Office 2,750,523
Patented June 12, 1956

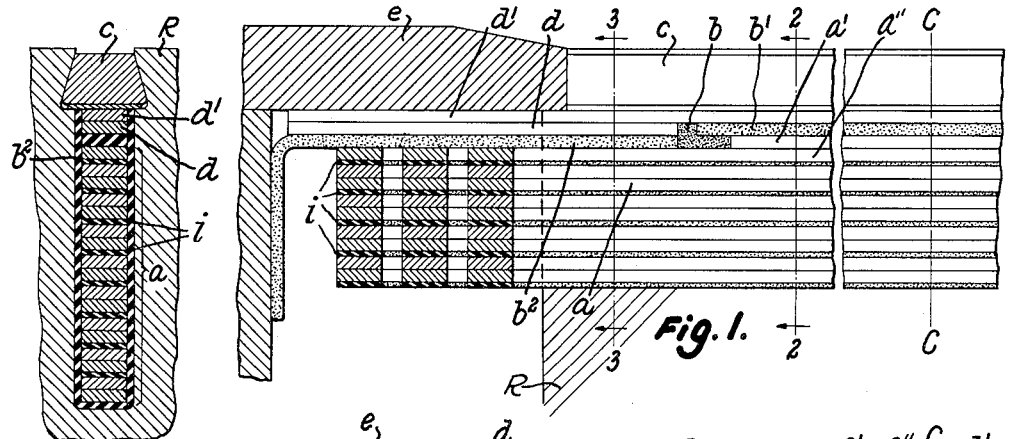
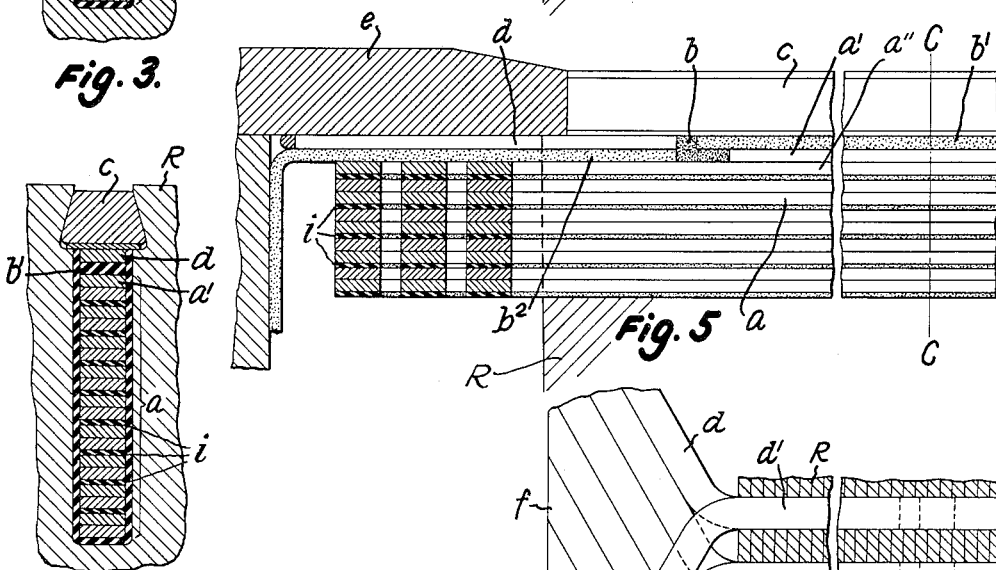
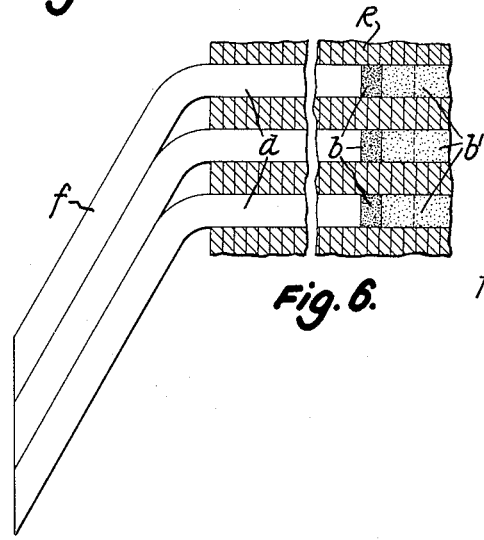
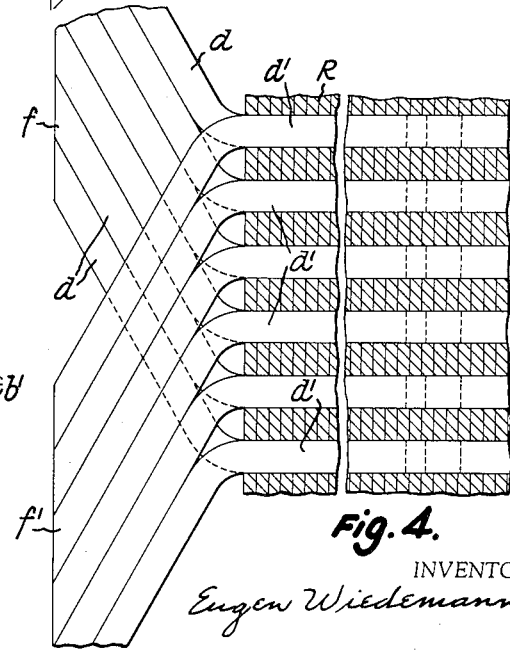

2,750,523

GENERATOR ROTOR WITH A DAMPING WINDING

Eugen Wiedemann, Spreitenbach, Switzerland, assignor to Aktiengesellschaft Brown, Boveri & Cie, Baden, Switzerland, a joint-stock company Application April 18, 1955, Serial No. 501,780

Claims priority, application Switzerland April 21, 1954

4 Claims. (Cl. 310—183)

This invention relates to a generator rotor with a damping winding and more particularly to a turbo-generator rotor with a damping winding located in the same slots with the field coils.

A disadvantage of the prior arrangement of damping windings is that these extend over the entire length of the rotor and thus occupy a space in the rotor slots which could otherwise be used for the accommodation of the field coils. There is thus a substantial reduction in field coil copper.

Objects of the present invention are to provide generator rotors with damping windings which greatly reduce this disadvantage. More specifically, objects are to provide generator rotors in which the cross-section of the field coil windings is reduced only in the region adjacent the end turns to provide space within the ends of the coil slots for the damping windings.

These and other objects and the advantages of the invention will be apparent from the following specification when taken with the accompanying drawings in which:

Fig. 1 is a fragmentary longitudinal section of the coil terminal end of a generator rotor as taken along one side of a rotor slot;

Figs. 2 and 3 are fragmentary transverse sections as taken on lines 2—2 and 3—3 respectively of Fig. 1;

Fig. 4 is a fragmentary development into a plane of a cylindrical section taken outside of the damping winding of Fig. 1;

Fig. 5 is a fragmentary longitudinal section, similar to Fig. 1, of a modified form of damping winding; and Fig. 6 is a fragmentary development into a plane of a cylindrical section taken outside of the damping winding of Fig. 5.

In the drawings, reference character R identifies a generator rotor having in its slots a field winding $a$ consisting of a number of parallel-connected copper bars, each pair of bars being insulated from the next pair by an insulation layer $i$. In the region of the end turns the field winding $a$ is reduced in cross-section, by terminating the outer copper bar $a'$ in each slot short of the rotor ends to provide a space for receiving the damping winding. In the embodiment shown in Figs. 1 to 4, an angle-shaped block $b$ of insulating material is fitted into the slot to seat against the end of conductor $a'$ and a strip $b^1$ of insulation is fitted over conductor $a'$. Conducting straps $d$ constituting part of the damping winding are fitted into the slot to seat against the insulating block $b$, and are insulated from windings $a$ by a strip of insulation $b^2$. The inner ends of the straps $d$ of the damping winding terminate short of the axial central plane of the rotor, indicated by broken line C—C, to avoid an excessive reduction in the amount of the field coil copper. Another conducting strap $d^1$ of the damping winding is fitted into the slot over the strap $d$ and insulating material strip $b^1$, and extends to the other end of the rotor. At each end of the rotor, the ends of the straps $d$ and $d^1$ are bent tangentially in opposite directions to bring the ends of the straps of the respective groups into engagement, thereby forming electrically closed short-circuiting rings $f$ and $f^1$ respectively of good mechanical stability, these concentric rings being forced into mutual contact due to the centrifugal effect which occurs when the rotor is in operation.

The slots are closed by wedges $c$ in customary manner, and the end shield $e$ of the rotor seats against the ends of the several wedges and over the ends of the damping windings.

In the constructional form shown in Figs. 5 and 6 the damper winding consists only of a single layer of straps $d$ which are located in the rotor slots in axial alignment with the shortened field winding conductors $a'$. In this case the slot wedges $c$ also act as part of the damper winding. As indicated in Fig. 6 the outer free ends of straps $d$ are bent tangentially in the same direction and into contact with each other to form a laminated short-circuit ring $f$.

The partly double layer arrangement of damper winding shown in Figs. 1–4 has a somewhat better damping effect than the single-layer damping straps shown in Figs. 5 and 6. The latter arrangement, however, possesses the advantage that there is more space available in the rotor slots for the field winding conductors.

I claim:

1. A generator rotor having slots for receiving field coils, a plurality of field coils having end turns and parallel sides, one side of several of said coils being arranged in stacked relation in said slots, at least one of said coil sides having a portion of reduced thickness within said slot, a damping winding, said damping winding having portions extending into the spaces in said slot created by said reduced thickness portions.

2. A generator rotor having slots for receiving field coils, a plurality of field coils having end turns and parallel sides, one side of several of said coils being arranged in stacked relation in said slots, a damping winding comprising electrically connected short-circuited bands encircling each end of said rotor, said bands having integral straps extending into said slots above and insulated from said field coils, the uppermost field coil sides in said slots having portions of reduced thickness at both ends thereof adjacent said end turns, and the integral straps of said damping winding in said slots having portions of reduced thickness between the ends of the slots, so that the portions of the damping winding straps having standard thickness fit into the spaces created by the reduction in thickness of said coil sides.

3. A generator rotor as defined in claim 2 wherein said integral straps in said slots form continuous members extending across said slots to electrically connect said short-circuited bands.

4. A generator rotor as defined in claim 2 wherein said integral straps in said slots terminate adjacent their ends of slot entry, and including wedge members in said slots above and in contact with said integral straps to electrically connect said short-circuited bands.

References Cited in the file of this patent

UNITED STATES PATENTS 1,262,774   Gilman _____ Apr. 16, 1918